Patented Jan. 23, 1940

2,187,728

UNITED STATES PATENT OFFICE 2,187,728

BARBITURIC ACIDS

Walter G. Christiansen, Glen Ridge, N. J., assignor to E. R. Squibb & Sons, New York, N. Y., a corporation of New York No Drawing. Application August 24, 1937, Serial No. 160,605

6 Claims. (Cl. 260—257)

This application is a continuation in part of application Serial No. 744,198, filed September 15, 1934, matured into Patent No. 2,117,299, granted May 17, 1938.

This invention relates to, and has for its object the provision of, barbituric acids of the general formula

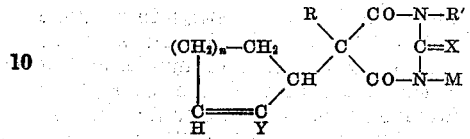

wherein $n$ represents 1 or 2, R represents alkyl, alkenyl, monocyclic aryl or monocyclic aralkyl, R' represents hydrogen, alkyl, or alkenyl, X represents O or S, M represents hydrogen, an alkali metal, an alkaline-earth metal, or an organic ammonium radical, and Y represents a halogen. These compounds may be prepared by reacting a substituted malonic acid derivative of the general formula

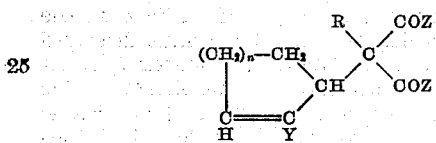

wherein $n$, R and Y have the above-designated meaning, and Z represents an alkoxy group, with a urea of the formula

wherein R' and X have the above-designated meaning; the preparation of these substituted malonic acid intermediates is also described and claimed in copending application Serial No. 160,607, filed concurrently herewith. These barbituric acids are valuable pharmaceuticals, being characterized by their hypnotic action. The following examples are illustrative of the invention:

Example 1

*5-ethyl-5-(2'-bromo-delta²'-cyclohexenyl)-barbituric acid*

100 g. 1,2,3-tribromo cyclohexane and 26.5 g. crushed potassium hydroxide are heated in a Claisen flask on a steam-bath while the system is evacuated; a vigorous reaction ensues, with distillation at 40 mm.; the distillate is dissolved in ether and the solution dried over sodium sulfate; the solvent is removed and the residual oil rectified; there is obtained the compound 1,2-dibromo-delta²-cyclohexene, a colorless oil boiling at 110–111°/7 mm.

33.3 g. of diethyl-ethyl-malonate is added to a solution, cooled at 30°, of 4.03 g. sodium in 75 cc. absolute alcohol, and while the temperature is maintained at 30–35° 42 g. 1,2-dibromo-delta²-cyclohexene is slowly added with stirring; the solution is refluxed six hours, and is then neutral to litmus; the sodium bromide is filtered off, the alcohol removed from the filtrate, and the residue rectified; there is obtained the compound diethyl ethyl-(2-bromo - delta²-cyclohexenyl)-malonate, a colorless oil boiling at 141.5–142.5°/1 mm.

To procure an aryl, aralkyl, alkenyl, or some alkyl other than ethyl in the desired brom-cyclohexenyl-malonate, the malonic ester containing that aryl, aralkyl, alkenyl or other alkyl (say phenyl-, benzyl-, allyl-, or methyl-, diethyl malonate, respectively) is employed instead of the diethyl ethyl-malonate in the foregoing procedure.

22.0 g. diethyl ethyl-(2-bromo-delta²-cyclohexenyl) malonate and 6.0 g. urea are successively added to a cold solution of 3.06 g. sodium in 56 cc. absolute alcohol; the mixture is refluxed six hours in an oil-bath at 120°; alcohol is removed by distilling in vacuo; the residue is diluted with 200 cc. cold water, and extracted with ether to recover unreacted ester; the aqueous alkaline solution is acidified with 50% acetic acid; and the precipitate, on being washed with water, dried in vacuo, and crystallized from benzene, yields the compound 5-ethyl-5-(2'-bromo-delta²'-cyclohexenyl)-barbituric acid, a white crystalline substance melting at 225–226°, soluble in alcohol and acetone but scantily soluble in water, benzene, and ether.

*Sodium salt of 5-ethyl-5-(2'-bromo-delta²'-cyclohexenyl)-barbituric acid*

A solution of 10 g. 5-ethyl-5-(2'-bromo-delta²'-cyclohexenyl)-barbituric acid in 31.6 cc. 1.0036 N sodium hydroxide solution, on being evaporated to dryness in vacuo and further dried in vacuo over calcium chloride, yields the sodium salt as a water-soluble white powder.

Example 2

*1,5-dimethyl-5-(2'-bromo-delta²'-cyclohexenyl)-barbituric acid*

7.0 g. of sodium is dissolved in 129 cc. absolute alcohol. Then 16.4 g. of N-methyl urea and 37.8 g. of diethyl methyl-(2-bromo-delta²-cyclohexenyl)-malonate are added. The mixture is refluxed for about 50 hours, whereupon the alcohol is distilled off in a vacuum. The residue is dissolved in water, and the solution extracted twice with ether to recover unreacted ester. After two decolorizations with charcoal, the solution is acidified with 50% acetic acid. The precipitated material is filtered, washed with water, and vacuum-dried. When crystallized from acetone, 1,5-dimethyl-5-(2'-bromo-delta$^{2'}$-cyclohexenyl)-barbituric acid is obtained as a white crystalline compound having a melting point of 192–193° C.

*Sodium salt of 1,5-dimethyl-5-(2'-bromo-delta$^{2'}$-cyclohexenyl)-barbituric acid*

4.675 g. of 1,5-dimethyl-5-(2'-bromo-delta$^{2'}$-cyclohexenyl)-barbituric acid is dissolved in 29.74 cc. of a 0.4989 normal sodium alcoholate solution. The alcohol is distilled off in a vacuum, and the residue heated in vacuo over phosphorus pentoxide. The sodium salt thus obtained is a white powder readily soluble in water.

EXAMPLE 3

*5-ethyl-5-(2'-bromo-delta$^{2'}$-cyclohexenyl)-thiobarbituric acid*

4 g. of sodium is dissolved in 73 cc. of absolute alcohol. Then 30 g. of diethyl ethyl-(2-bromo-delta$^2$-cyclohexenyl)-malonate and 15 g. of thiourea are added. The mixture is refluxed for about 50 hours, whereupon the alcohol is distilled off in a vacuum. The residue is dissolved in water, and the solution extracted twice with ether to recover unreacted ester. The solution is then acidified with 50% acetic acid and the precipitated material is filtered, washed with water and dried in a vacuum. On recrystallizing from benzene, 5-ethyl-5-(2'-bromo-delta$^{2'}$-cyclohexenyl)-thiobarbituric acid is obtained as a light-yellow crystalline material having a melting point of 196–197° C.

*Sodium salt of 5-ethyl-5-(2'-bromo-delta$^{2'}$-cyclohexenyl)-thiobarbituric acid*

2.792 g. of 5-ethyl-5-(2'-bromo-delta$^{2'}$-cyclohexenyl)-thiobarbituric acid is dissolved in 17.02 cc. of an 0.4956 normal sodium in absolute alcohol solution. The solution is distilled to dryness in a vacuum; the residue is the sodium salt, a light-yellow powder readily soluble in water.

EXAMPLE 4

*1,5-dimethyl-5-(2'-bromo-delta$^{2'}$-cyclopentenyl)-barbituric acid*

4.8 grams of sodium is dissolved in 85 cc. of absolute alcohol and then 17.5 grams of diethyl methyl-(2-bromo-delta$^2$-cyclopentenyl)-malonate and 8.0 grams of N-methyl urea are added thereto. This mixture is refluxed for 50 hours, the alcohol is distilled off, and the residue dissolved in 250 cc. of water. The resulting solution is clarified by shaking with charcoal and filtered. The filtrate is acidified with acetic acid, a brown material separates which is filtered, washed with water and vacuum dried. This crude barbituric acid is recrystallized from a mixture of benzene and petroleum ether whereupon 1,5-dimethyl-5-(2'-bromo-delta$^2$-cyclopentenyl)-barbituric acid is obtained as a white crystalline material of melting point 143.5–144° C.

*Sodium salt of 1,5-dimethyl-5-(2'-bromo-delta$^{2'}$-cyclopentenyl)-barbituric acid*

5.0 grams of 1,5-dimethyl-5-(2'-bromo-delta$^{2'}$-cyclopentenyl)-barbituric acid is dissolved in 33.4 cc. of an 0.4989 N sodium ethylate solution (equivalent to 0.3833 gram of sodium) and the solution evaporated to dryness in a vacuum. The sodium salt is obtained as a white powder which is easily soluble in water.

EXAMPLE 5

*5-ethyl-5-(2'-bromo-delta$^{2'}$-cyclopentenyl)-barbituric acid*

6.0 grams of sodium is dissolved in 110 cc. of absolute alcohol and then 30.0 grams of diethyl ethyl-(2-bromo-delta$^2$-cyclopentenyl)-malonate and 10.0 grams of urea are added. The mixture is refluxed for a period of 50 hours, the alcohol is distilled off, and the residue dissolved in 250 cc. of water. The resulting solution is clarified by shaking with charcoal and filtered. The filtrate is acidified with acetic acid and the precipitated brown material is filtered, washed with water and vacuum dried. When recrystallized from dilute alcohol 5-ethyl-5-(2'-cyclopentenyl)-barbituric acid is a white crystalline compound of melting point of 185–186° C.

*Sodium salt of 5-ethyl-5-(2'-bromo-delta$^{2'}$-cyclopentenyl)-barbituric acid*

5.0 grams of the barbituric acid is dissolved in 33.4 cc. of an 0.4989 N sodium ethylate solution (equivalent to 0.3833 g. of sodium). The solution is evaporated to dryness in a vacuum and the residue is further dried in a vacuum over phosphorous pentoxide at 100° C. The sodium salt is obtained as a white powder which is easily soluble in water.

EXAMPLE 6

*5-ethyl-5-(2'-bromo-delta$^{2'}$-cyclopentenyl)-thiobarbituric acid*

6.84 grams of sodium is dissolved in 125 cc. of absolute alcohol and then 27.5 grams of diethyl ethyl-(2-bromo-delta$^2$-cyclopentenyl)-malonate and 10.0 grams of thiourea are added. The mixture is refluxed for a period of 50 hrs., the alcohol is distilled off, and the residue dissolved in 400 cc. of water. The latter solution is clarified by shaking with charcoal and filtered. The filtrate is treated with gaseous carbon dioxide whereupon the crude thiobarbituric acid is obtained as a brown precipitate. The material is filtered, washed with water and vacuum dried. When crystallized from aqueous alcohol 5-ethyl-5-(2'-bromo-delta$^{2'}$-cyclopentenyl)-thiobarbituric acid is obtained as a yellowish-white crystalline compound of melting point 210–211° C.

*Sodium salt of 5-ethyl-5-(2'-bromo-delta$^{2'}$-cyclopentenyl)-thiobarbituric acid*

5.0 grams of the thiobarbituric acid is dissolved in 31.62 cc. of an 0.4989 N sodium ethylate solution (equivalent to 0.3629 g. of sodium). The solution is evaporated to dryness in a vacuum and the residue further dried in a vacuum over phosphorous pentoxide at 100° C. The sodium salt is obtained as a yellowish white powder which is easily soluble in water.

EXAMPLE 7

*5-allyl-5-(2'bromo-delta$^{2'}$-cyclopentenyl)-barbituric acid*

3.4 grams of sodium is dissolved in 70 cc. of absolute alcohol and then 15.0 grams of diethyl allyl-(2-bromo-delta$^2$-cyclopentenyl)-malonate and 5.0 grams of urea are added. This mixture is refluxed for a period of 50 hours, the alcohol is distilled off, and the residue dissolved in 250 cc.

of water. This solution is acidified with acetic acid and the resulting brownish yellow material is filtered, washed with water and vacuum dried. When recrystallized from a mixture of benzene and petroleum ether, 5-allyl-5-(2'-bromo-delta$^{2'}$-cyclopentenyl)-barbituric acid is obtained as a white crystalline compound of melting point 170–171° C.

*Sodium salt of 5-allyl-5-(2'-bromo-delta$^{2'}$-cyclopentenyl)-barbituric acid*

5.0 grams of the barbituric acid is dissolved in 32.1 cc. of an 0.4973 N sodium ethylate solution (equivalent to 0.3674 g. of sodium). The solution is evaporated to dryness in a vacuum and the residue is further dried in a vacuum over phosphorous pentoxide at 100° C. The sodium salt is obtained as a white powder which is easily soluble in water.

EXAMPLE 8

*5-allyl-5-(2'-bromo-delta$^{2'}$-cyclopentenyl) - thiobarbituric acid*

3.7 grams of sodium is dissolved in 70 cc. of absolute alcohol and then 15.0 grams of diethyl allyl-(2-bromo-delta$^2$ - cyclopentenyl) - malonate and 6.2 grams of thiourea are added. The mixture is refluxed for a period of 50 hours, the alcohol is distilled off, and the residue dissolved in 350 cc. of water. The latter solution is treated with gaseous carbon dioxide whereupon a brown precipitate is obtained which is filtered, washed with water and vacuum dried. When crystallized from aqueous alcohol, 5-allyl-5-(2'-bromo-delta$^{2'}$-cyclopentenyl)-thiobarbituric acid is obtained as a yellowish-white crystalline compound of melting point 156–157° C.

*Sodium salt of 5-allyl-5-(2'-bromo-delta$^{2'}$-cyclopentenyl)-thiobarbituric acid*

5.0 grams of this thiobarbituric acid is dissolved in 30.56 cc. of an 0.4973 N sodium ethylate solution (equivalent to 0.3495 g. of sodium). The solution is evaporated to dryness in a vacuum, and the residue further dried in a vacuum over phosphorous pentoxide at 100° C. The sodium salt is a white powder.

EXAMPLE 9

*1 - methyl - 5 - allyl-5- (2'-bromo-delta$^{2'}$-cyclopentenyl)-barbituric acid*

4.0 grams of sodium is dissolved in 80 cc. of absolute alcohol and then 15.0 grams of diethyl allyl-(2-bromo-delta$^2$ - cyclopentenyl) - malonate and 7.0 grams of N-methyl urea are added. The mixture is refluxed for fifty hours, the alcohol is distilled off, and the residue dissolved in 250 cc. of water. The latter solution is acidified with acetic acid and the precipitated brown material is filtered, washed with water and vacuum dried. When crystallized from aqueous alcohol, 1-methyl-5-allyl-5-(2'- bromo - delta$^{2'}$ - cyclopentenyl)-barbituric acid is obtained as a white crystalline compound of melting point 146.5–147.5° C.

*Sodium salt of 1-methyl-5-allyl-5-(2'-bromo-delta$^{2'}$-cyclopentenyl)-barbituric acid*

5.0 grams of the barbituric acid is dissolved in 30.75 cc. of an 0.4973 N sodium ethylate solution (equivalent to 0.3517 g. of sodium). The solution is evaporated to dryness in a vacuum and the residue further dried in a vacuum over phosphorous pentoxide at 100° C. The sodium salt is obtained as a white powder.

Among the many other compounds that may be prepared in accordance with this invention are:

5-isopropyl - 5 -(2'-bromo-delta$^{2'}$-cyclohexenyl)-barbituric acid
5-ethyl-5-(2'-chloro-delta$^{2'}$-cyclohexenyl) - barbituric acid
5-n-butyl - 5 -(2'-chloro - delta$^{2'}$- cyclohexenyl)-barbituric acid
5-phenyl-5 - (2' - chloro - delta$^{2'}$ - cyclohexenyl)-barbituric acid
Sodium salt of 5-methyl-5-(2'-bromo-delta$^{2'}$-cyclohexenyl)-barbituric acid
Sodium salt of 5-benzyl-5-(2'-chloro-delta$^{2'}$-cyclohexenyl)-barbituric acid
1-ethyl-5-methyl-5-(2'-chloro-delta$^{2'}$ - cyclohexenyl)-barbituric acid
1-methyl-5-benzyl-5-(2' - bromo - delta$^{2'}$ - cyclohexenyl)-barbituric acid
1-methyl-5-ethyl-5-(2'-bromo-delta$^{2'}$ - cyclohexenyl)-barbituric acid
1-ethyl-5-methyl-5-(2'-bromo-delta$^{2'}$- cyclohexenyl)-barbituric acid
1-allyl-5-methyl - 5 -(2'- bromo-delta$^{2'}$-cyclohexenyl)-barbituric acid
1,5-diallyl-5-(2'- bromo - delta$^{2'}$ - cyclohexenyl)-barbituric acid
5 - methyl - 5 - (2'- bromo-delta$^{2'}$-cyclohexenyl)-barbituric acid
5-methyl - 5 -(2'- bromo - delta$^{2'}$- cyclohexenyl)-thiobarbituric acid
5-allyl-5-(2'-bromo-delta$^{2'}$-cyclohexenyl) - thiobarbituric acid These compounds may be prepared in a manner like that detailed in the specific examples, using the corresponding substituted reactants. Thus 1-methyl-5-ethyl-5-(2'-bromo-delta$^{2'}$- cyclohexenyl)-barbituric acid may be prepared by condensing diethyl ethyl-(2-bromo-delta$^2$-cyclohexenyl)-malonate with N-methyl-urea. The 1-ethyl and 1-allyl barbituric acids are prepared by using N-ethyl-urea and N-allyl-urea, respectively, as reactants. The 5-allyl barbituric acids are prepared by using the corresponding allyl-malonic acid esters as reactants. The 5-phenyl and 5-benzyl barbituric acids are obtained by using the corresponding phenyl- and benzyl-malonic acid esters as reactants.

The calcium salt of the barbituric acids may be obtained, for example, by treating an ammoniacal solution of the barbituric acid with calcium chloride. The organic ammonium salts may be prepared in the conventional manner, using the corresponding amines, e. g., ethylene diamine, monoethanolamine, etc.

The invention may be variously otherwise embodied within the scope of the appended claims.

I claim:
1. Compounds having the general formula

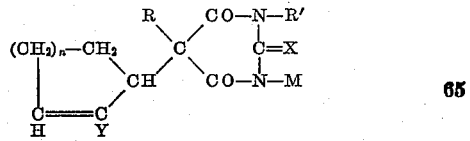

wherein $n$ represents one of the numerals 1 and 2, R represents a member of the class consisting of alkyl, alkenyl, monocyclic aryl, and monocyclic aralkyl, R' represents a member of the class consisting of hydrogen, alkyl, and alkenyl, X represents a member of the class consisting of O and S, M represents a member of the class consisting of hydrogen, alkali metals, alkaline-earth metals, and organic ammonium radicals, and Y represents a halogen.

2. 5-ethyl-5-(2'-bromo-delta$^{2'}$-cyclohexenyl)-thiobarbituric acid.

3. 5-ethyl-5-(2'-bromo-delta$^{2'}$-cyclopentenyl)-thiobarbituric acid.

4. 5-allyl-5-(2'-bromo-delta$^{2'}$-cyclopentenyl)-barbituric acid.

5. Compounds having the general formula

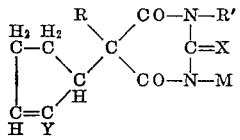

wherein R represents a member of the class consisting of alkyl, alkenyl, monocyclic aryl, and monocyclic aralkyl, R' represents a member of the class consisting of hydrogen, alkyl, and alkenyl, X represents a member of the class consisting of O and S, M represents a member of the class consisting of hydrogen, alkali metals, alkaline-earth metals, and organic ammonium radicals, and Y represents a halogen.

6. Compounds having the general formula

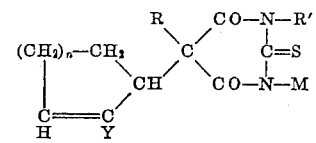

wherein $n$ represents one of the numerals 1 and 2, R represents a member of the class consisting of alkyl, alkenyl, monocyclic aryl, and monocyclic aralkyl, R' represents a member of the class consisting of hydrogen, alkyl, and alkenyl, M represents a member of the class consisting of hydrogen, alkali metals, alkaline-earth metals, and organic ammonium radicals, and Y represents halogen.

WALTER G. CHRISTIANSEN.